United States Patent
Yang et al.

(10) Patent No.: US 9,973,399 B2
(45) Date of Patent: May 15, 2018

(54) IPV6 ADDRESS TRACING METHOD, APPARATUS, AND SYSTEM

(71) Applicant: Huawei Technologies Co., Ltd., Shenzhen, Guangdong (CN)

(72) Inventors: Xi Yang, Beijing (CN); Yafeng Zhang, Nanjing (CN); Shuxiang Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 148 days.

(21) Appl. No.: 14/747,559

(22) Filed: Jun. 23, 2015

(65) Prior Publication Data

US 2015/0288581 A1    Oct. 8, 2015

Related U.S. Application Data

(63) Continuation of application No. PCT/CN2012/087654, filed on Dec. 27, 2012.

(51) Int. Cl.
| | |
|---|---|
| *G06F 15/16* | (2006.01) |
| *H04L 12/26* | (2006.01) |
| *H04L 29/06* | (2006.01) |
| *H04L 12/715* | (2013.01) |
| *H04L 12/14* | (2006.01) |
| *H04L 29/12* | (2006.01) |

(52) U.S. Cl.
CPC .............. *H04L 43/04* (2013.01); *H04L 12/14* (2013.01); *H04L 43/028* (2013.01); *H04L 45/04* (2013.01); *H04L 63/08* (2013.01); *H04L 63/0861* (2013.01); *H04L 63/0892* (2013.01); *H04L 61/203* (2013.01); *H04L 61/6059* (2013.01); *H04L 63/30* (2013.01)

(58) Field of Classification Search
CPC ............ H04L 63/0861; H04L 63/0853; H04L 2209/805; H04L 9/3231
USPC .................................................. 726/5, 10, 29
See application file for complete search history.

(56) References Cited

U.S. PATENT DOCUMENTS

| | | | |
|---|---|---|---|
| 7,827,609 B2 | 11/2010 | Hong et al. | |
| 2003/0237002 A1* | 12/2003 | Oishi | H04L 63/08 726/10 |
| 2007/0157314 A1 | 7/2007 | Hong et al. | |

(Continued)

FOREIGN PATENT DOCUMENTS

| | | |
|---|---|---|
| CN | 101005461 A | 7/2007 |
| CN | 101710906 A | 5/2010 |

(Continued)

OTHER PUBLICATIONS

S. Deering, et al., "Internet Protocol, Version 6 (IPv6) Specification", Network Working Group, Dec. 1998, 39 pages.

(Continued)

*Primary Examiner* — Kyung H Shin

(57) ABSTRACT

The present application provides an IPv6 address tracing method, apparatus, and system, where the method includes: receiving a to-be-traced target IPv6 address; selecting, in a longest match manner, IPv6 address information that matches the target IPv6 address, where the IPv6 address information includes an IPv6 address or IPv6 prefix information; and acquiring a user identifier corresponding to the IPv6 address information. The present application implements IPv6 address tracing.

3 Claims, 6 Drawing Sheets

(56) References Cited

U.S. PATENT DOCUMENTS

2008/0120707 A1* 5/2008 Ramia ................ H04L 63/0861
                                                      726/5
2012/0127997 A1* 5/2012 Zinjuwadia ............ H04L 45/04
                                                      370/392

FOREIGN PATENT DOCUMENTS

| CN | 102790812 A | 11/2012 |
| CN | 102801821 A | 11/2012 |
| EP | 1 054 529 A2 | 11/2000 |
| KR | 100770354 B1 | 10/2007 |
| KR | 101081433 B1 | 11/2011 |
| WO | WO 03/069509 A2 | 8/2003 |
| WO | WO 2013/107055 A1 | 7/2013 |

OTHER PUBLICATIONS

Torsten Little toe, "The Internet Protocol 6 changes the game", Zeit Online, Jan. 20, 2011, 5 pages.
Bruce J. Nikkel, "An introduction to investigating IPv6 networks", Digital Investigation, vol. 4, No. 2, Jul. 17, 2007, p. 59-67.

* cited by examiner

IPV6 ADDRESS TRACING METHOD, APPARATUS, AND SYSTEM

CROSS-REFERENCE TO RELATED APPLICATIONS

This application is a continuation of International Application No. PCT/CN2012/087654, filed on Dec. 27, 2012, which is hereby incorporated by reference in its entirety.

TECHNICAL FIELD

The present application relates to communications technologies, and in particular, to an IPv6 address tracing method, apparatus, and system.

BACKGROUND

In a network application, sometimes it is required to perform tracing according to an IP address used by a user for surfing the Internet. For example, a typical application scenario is that when illegal information appears on the Internet, a public security department needs to find a suspect who posts the illegal information, and can find user identity information of a suspect by tracing an IP address left by the suspect on the Internet.

An IPv4 address tracing method is already used on an existing IPv4 network. For example, during network access of a home broadband user by using the PPP over Ethernet (PPPoE) protocol, a broadband remote access server (BRAS) is responsible for transparently transmitting a user account and a password that are entered during a user authentication process to an authentication, authorization and accounting (AAA) server, and allocating, after receiving a result that is returned by the AAA server and indicates that authentication succeeds, an IPv4 address to a terminal used by the user. In addition, the BRAS may further report, in an accounting procedure, the foregoing user account and IPv4 address to the AAA server, so that the AAA server searches for corresponding user identity information according to the user account, and establishes a mapping relationship between the IPv4 address and the user identity information. Therefore, in subsequent tracing, identity information of the suspect may be found according to the IPv4 address left by the suspect, to implement tracing. It can be learned that, during the foregoing address tracing process, it is a user identifier (such as the foregoing user account) that associates the IPv4 address with the user identity information. Therefore, a key for the IPv4 address tracing is to find a user identifier corresponding to a to-be-traced target IPv4 address.

With large-scale deployment and commercial use of IPv6 in fixed networks and mobile networks, upgrading and reconstruction of IPv6-related systems are drawing increasing attention, where IPv6 address tracing, as an important security feature of IPv6, needs to be resolved. However, in existing IPv4 address tracing, a structure and an allocation manner of an IPv4 address are relatively simple, and reporting of an IPv4 address and a tracing method on the AAA side are both designed for an IPv4 address; while an allocation manner and an address structure of an IPv6 address are relatively complex and differ greatly from those of an IPv4 address. For example, an allocated IP address may be an IPv6 address, or an IPv6 prefix with a variable length. An existing IPv4 address tracing manner cannot implement tracing of an IPv6 address.

SUMMARY

The present application provides an IPv6 address tracing method, apparatus, and system, to implement IPv6 address tracing.

According to a first aspect, an IPv6 address tracing method is provided, where the method includes:

receiving a to-be-traced target IPv6 address;

selecting, in a longest match manner, IPv6 address information that matches the target IPv6 address, where the IPv6 address information includes an IPv6 address or IPv6 prefix information; and acquiring a user identifier corresponding to the IPv6 address information.

With reference to the first aspect, in a first possible implementation manner, before the receiving a to-be-traced target IPv6 address, the method further includes: receiving the user identifier and the IPv6 address information corresponding to the user identifier that are sent by an access device; and saving a correspondence between the user identifier and the IPv6 address information.

With reference to the first possible implementation manner of the first aspect, in a second possible implementation manner, the method further includes: acquiring, according to the user identifier, user identity information that is stored in an IPv6 address tracing apparatus and corresponding to the user identifier, and saving a mapping relationship between the IPv6 address information, the user identifier, and the user identity information; and after the acquiring a user identifier corresponding to the IPv6 address information, the method further includes: acquiring, according to the mapping relationship, the user identity information corresponding to the user identifier.

With reference to the first possible implementation manner of the first aspect, in a third possible implementation manner, after the acquiring a user identifier corresponding to the IPv6 address information, the method further includes: acquiring, from an authentication server according to the user identifier, user identity information corresponding to the user identifier.

With reference to the first aspect or any one of the first possible implementation manner to the third possible implementation manner of the first aspect, in a fourth possible implementation manner, the IPv6 prefix information includes any one of the following: an IPv6 prefix, an IPv6-PD prefix, and an interface identifier.

According to a second aspect, an IPv6 address tracing apparatus is provided, where the apparatus includes:

an information receiving unit, configured to receive a to-be-traced target IPv6 address;

an address matching unit, configured to select, in a longest match manner, IPv6 address information that matches the target IPv6 address, where the IPv6 address information includes an IPv6 address or IPv6 prefix information; and a tracing processing unit, configured to acquire a user identifier corresponding to the IPv6 address information.

With reference to the second aspect, in a first possible implementation manner, the information receiving unit is further configured to: before receiving the target IPv6 address, receive the user identifier and the IPv6 address information corresponding to the user identifier that are sent by an access device; and the IPv6 address tracing apparatus further includes: a mapping establishing unit, configured to store a correspondence between the user identifier and the IPv6 address information.

With reference to the first possible implementation manner of the second aspect, in a second possible implementation manner, the mapping establishing unit is further configured to acquire, according to the user identifier, user identity information that is stored in the mapping establishing unit and corresponding to the user identifier, and store a mapping relationship between the IPv6 address information, the user identifier, and the user identity information; and the tracing processing unit is further configured to: after acquiring the user identifier corresponding to the IPv6 address information, obtain, according to the mapping relationship, the user identity information corresponding to the user identifier.

With reference to the first possible implementation manner of the second aspect, in a third possible implementation manner, the tracing processing unit is further configured to: after acquiring the user identifier corresponding to the IPv6 address information, acquire, from an authentication server according to the user identifier, user identity information corresponding to the user identifier.

With reference to the second aspect or any one of the first possible implementation manner to the third possible implementation manner of the second aspect, in a fourth possible implementation manner, the IPv6 prefix information includes any one of the following: an IPv6 prefix, an IPv6-PD prefix, and an interface identifier.

According to a third aspect, an IPv6 address tracing system is provided, where the system includes an IPv6 address tracing apparatus; where:

the IPv6 address tracing apparatus is configured to receive a to-be-traced target IPv6 address; select, in a longest match manner, IPv6 address information that matches the target IPv6 address, where the IPv6 address information includes an IPv6 address or IPv6 prefix information; and acquire a user identifier corresponding to the IPv6 address information.

With reference to the third aspect, in a first possible implementation manner, the system further includes an access device; where:

the access device is configured to: before the IPv6 address tracing apparatus receives the to-be-traced target IPv6 address, send, to the IPv6 address tracing apparatus, the user identifier and the IPv6 address information corresponding to the user identifier; and the IPv6 address tracing apparatus is further configured to store a correspondence between the user identifier and the IPv6 address information.

With reference to the first possible implementation manner of the third aspect, in a second possible implementation manner, the IPv6 address tracing apparatus is further configured to acquire, according to the user identifier, user identity information that is stored in the IPv6 address tracing apparatus and corresponding to the user identifier, and store a mapping relationship between the IPv6 address information, the user identifier, and the user identity information; and after acquiring the user identifier corresponding to the IPv6 address information, obtain, according to the mapping relationship, the user identity information corresponding to the user identifier.

With reference to the first possible implementation manner of the third aspect, in a third possible implementation manner, the system further includes an authentication server; where:

the IPv6 address tracing apparatus is further configured to: after acquiring the user identifier corresponding to the IPv6 address information, acquire, from the authentication server according to the user identifier, user identity information corresponding to the user identifier.

With reference to the third aspect or any one of the first possible implementation manner to the third possible implementation manner of the third aspect, in a fourth possible implementation manner, the IPv6 prefix information includes any one of the following: an IPv6 prefix, an IPv6-PD prefix, and an interface identifier.

A technical effect of the IPv6 address tracing method, apparatus, and system according to the present application is that: IPv6 address information that matches a to-be-traced target IPv6 address is selected in a longest match manner, and a corresponding user identifier according to the IPv6 address information is acquired, thereby implementing IPv6 address tracing.

DESCRIPTION OF EMBODIMENTS

Embodiment 1

Figure 1:
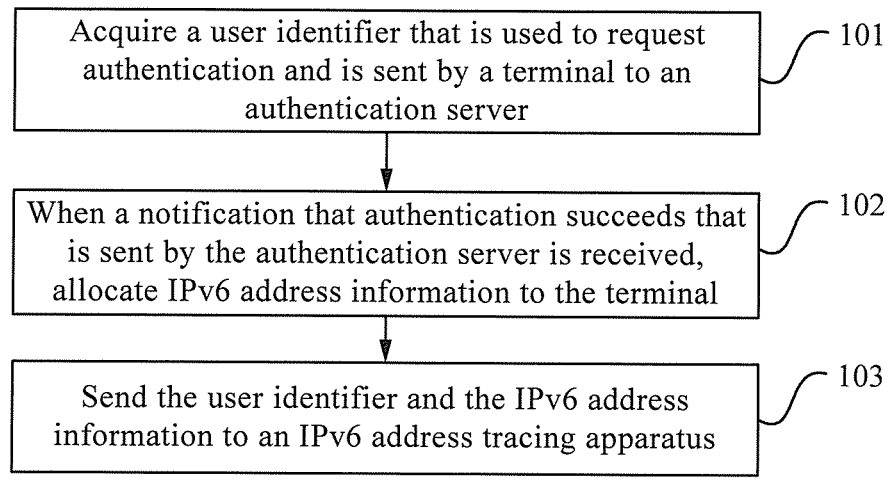
FIG. 1 is a schematic flowchart of an IPv6 address tracing method according to an embodiment of the present application.

FIG. 1 is a schematic flowchart of an IPv6 address tracing method according to an embodiment of the present application. The method is executed by an access device, where the access device is, for example, a BRAS. In this embodiment, the BRAS is used as an example to describe the method. As shown in FIG. 1, the method may include the following steps:

101. Acquire a user identifier that is used to request authentication and is sent by a terminal to an authentication server.

For example, in a procedure for authenticating a user, the user sends, by using a terminal used by the user, authentication information such as the user identifier, a password, and the like to the authentication server, for example, an AAA server, where the user identifier may be generally a user account, a user name, or the like that is entered by the user. During an actual process of sending authentication information from the terminal to the authentication server, the authentication information is transmitted by using the BRAS. For example, the terminal sends the authentication information to the BRAS, and the BRAS transmits the authentication information to the authentication server. During this process, the BRAS acquires the authentication information such as the user identifier.

102. When a notification that authentication succeeds that is sent by the authentication server is received, allocate IPv6 address information to the terminal, where the IPv6 address information includes an IPv6 address and/or an IPv6 prefix.

For example, after authentication of the authentication information of the user succeeds, the authentication server sends, to the BRAS, a notification that authentication succeeds, and then the BRAS sends the notification to the terminal to notify the user. In addition, after authentication of the user succeeds, the BRAS allocates an IP address to the terminal used by the user, so that the user uses the IP address when accessing a network subsequently. In this embodiment of the present application, the IP address allocated by the BRAS is an IPv6 address.

Because a manner of allocating an IPv6 address is relatively complex, and there are multiple address allocation manners, forms of an IPv6 address allocated by the BRAS to the terminal vary with different allocation manners or in different application scenarios. For example, an allocated IP address may be an IPv6 address of 128 bits, an IPv6 prefix of 64 bits and an interface identifier (Interface ID) of 64 bits, or an IPv6-PD prefix and an IPv6 address of 128 bits. An existing allocation manner of an IPv4 address is relatively simple, that is, an IPv4 address of 32 bits. Therefore, a form of an IPv6 address differs greatly from that of an IPv4 address. In this embodiment, multiple forms of allocated IPv6 addresses are collectively referred to as IPv6 address information.

103. Send the user identifier and the IPv6 address information to an IPv6 address tracing apparatus.

In this embodiment, the BRAS can send the IPv6 address information to the IPv6 address tracing apparatus, and further send the user identifier acquired in step 101 to the IPv6 address tracing apparatus. When the BRAS allocates IPv6 address information to the terminal, because the IPv6 address information is allocated when a notification that authentication of the user succeeds is received, where the notification is sent by the authentication server, the BRAS can learn which user identifier is corresponding to a terminal to which the IPv6 address information is allocated, that is, the BRAS can learn a correspondence between the IPv6 address information and the user identifier, and report the IPv6 address information and the user identifier to the IPv6 address tracing apparatus.

It should be noted that, the IPv6 address information and the user identifier that are reported by the BRAS in this embodiment are two separate pieces of information, where the IPv6 address information is a common address, and no other information is embedded in the IPv6 address information. That is, in this embodiment, tracing of an IPv6 address may be implemented by reporting common allocated IPv6 address information and a user identifier.

The IPv6 address tracing apparatus side may or may not store user identity information. When the apparatus stores user identity information, the IPv6 address tracing apparatus can acquire, according to the user identifier, user identity information corresponding to the user identifier, and because the user identifier is corresponding to the IPv6 address information, and the user identifier is corresponding to the user identity information, there is a mapping relationship between the user identity information, the user identifier, and the IPv6 address information, and the IPv6 address tracing apparatus may perform tracing according to the mapping relationship. For example, after acquiring the IPv6 address information that matches a to-be-traced target IPv6 address, the IPv6 address tracing apparatus acquires corresponding user identity information according to the mapping relationship.

When the apparatus does not store user identity information, the IPv6 address tracing apparatus described in this embodiment may search, after acquiring the IPv6 address information that matches the to-be-traced target IPv6 address, a corresponding user identifier according to the IPv6 address information, and then acquire, in a specific manner, user identity information corresponding to the user identifier from another device, for example, the authentication server.

According to the IPv6 address tracing method in this embodiment, an access device sends a user identifier and IPv6 address information to an IPv6 address tracing apparatus, so that the IPv6 address tracing apparatus can perform tracing according to a mapping relationship between the IPv6 address information and the user identifier reported at the same time. Therefore, the access device provides the user identifier and the IPv6 address information that have a correspondence and are necessary to establish the mapping relationship and implement IPv6 address tracing.

Embodiment 2

Figure 2:
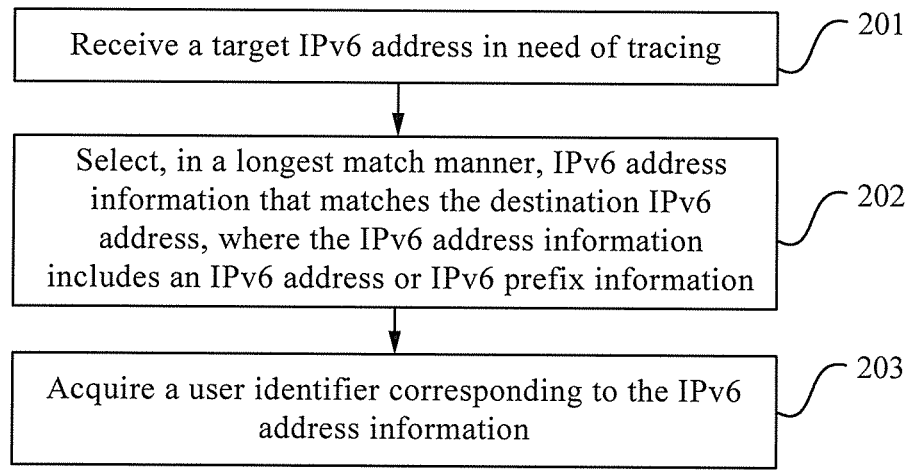
FIG. 2 is a schematic flowchart of an IPv6 address tracing method according to another embodiment of the present application.

FIG. 2 is a schematic flowchart of an IPv6 address tracing method according to another embodiment of the present application. The method is executed by an IPv6 address tracing apparatus. As shown in FIG. 2, the method may include the following steps:

201. Receive a to-be-traced target IPv6 address.

The receiving a to-be-traced target IPv6 address may be receiving, by the IPv6 address tracing apparatus, a target IPv6 address entered by an administrator, or may be acquiring a target IPv6 address in another manner. The target IPv6 address refers to a to-be-traced address. For example, when illegal information appears on the Internet, to investigate a suspect who posts the illegal information, a public security department needs to trace an IPv6 address left on the Internet when the suspect surfs the Internet; then, the IPv6 address left by the suspect on the Internet is a to-be-traced target IPv6 address, and the public security department needs to search for user identity information corresponding to the target IPv6 address.

202. Select, in a longest match manner, IPv6 address information that matches the target IPv6 address, where the IPv6 address information includes an IPv6 address or IPv6 prefix information.

In this embodiment, searching for the IPv6 address information that matches the target IPv6 address is also different from searching for IPv4 address information that matches an IPv4 address. For example, when an existing IPv4 address is traced, because a form of an IPv4 address is simple, that is, an IPv4 address of 32 bits, an exact match manner may be used, and an IPv4 address with identical 32 bits is considered as a matched IPv4 address. However, forms of an IPv6 address in this embodiment are relatively complex, and include multiple forms such as an IPv6 address and an IPv6 prefix. When address matching is performed, some bits of multiple pieces of IPv6 address information may be the same as those of the target IPv6 address. In this case, IPv6 address information that has the most information matching the target IPv6 address may be selected, for example, in a longest match manner, as the IPv6 address information that matches the target IPv6 address.

The IPv6 address information includes the IPv6 address or the IPv6 prefix information. For example, the IPv6 address is an IPv6 address of 128 bits, and the IPv6 prefix information includes information such as an IPv6 prefix, an IPv6-PD prefix, or an interface identifier.

203. Acquire a user identifier corresponding to the IPv6 address information.

For example, the user identifier and the IPv6 address information corresponding to the user identifier are received by the IPv6 address tracing apparatus from an access device, where the IPv6 address tracing apparatus is, for example, an authentication server, and the access device is, for example, a BRAS.

In this step, after the IPv6 address tracing apparatus acquires the IPv6 address information that matches the target IPv6 address and acquires, according to a mapping relationship between the IPv6 address information and the user identifier, the user identifier corresponding to the target IPv6 address, if the IPv6 address tracing apparatus stores user identity information and a mapping relationship between the user identity information and the user identifier and the IPv6 address information, the apparatus can directly find, according to the mapping relationship, the user identity information corresponding to the IPv6 address information; or if the IPv6 address tracing apparatus does not store user identity information, the IPv6 address tracing apparatus acquires, from another device, for example, the authentication server, according to the user identifier corresponding to the IPv6 address information, the user identity information corresponding to the user identifier.

Embodiment 3

Figure 3:
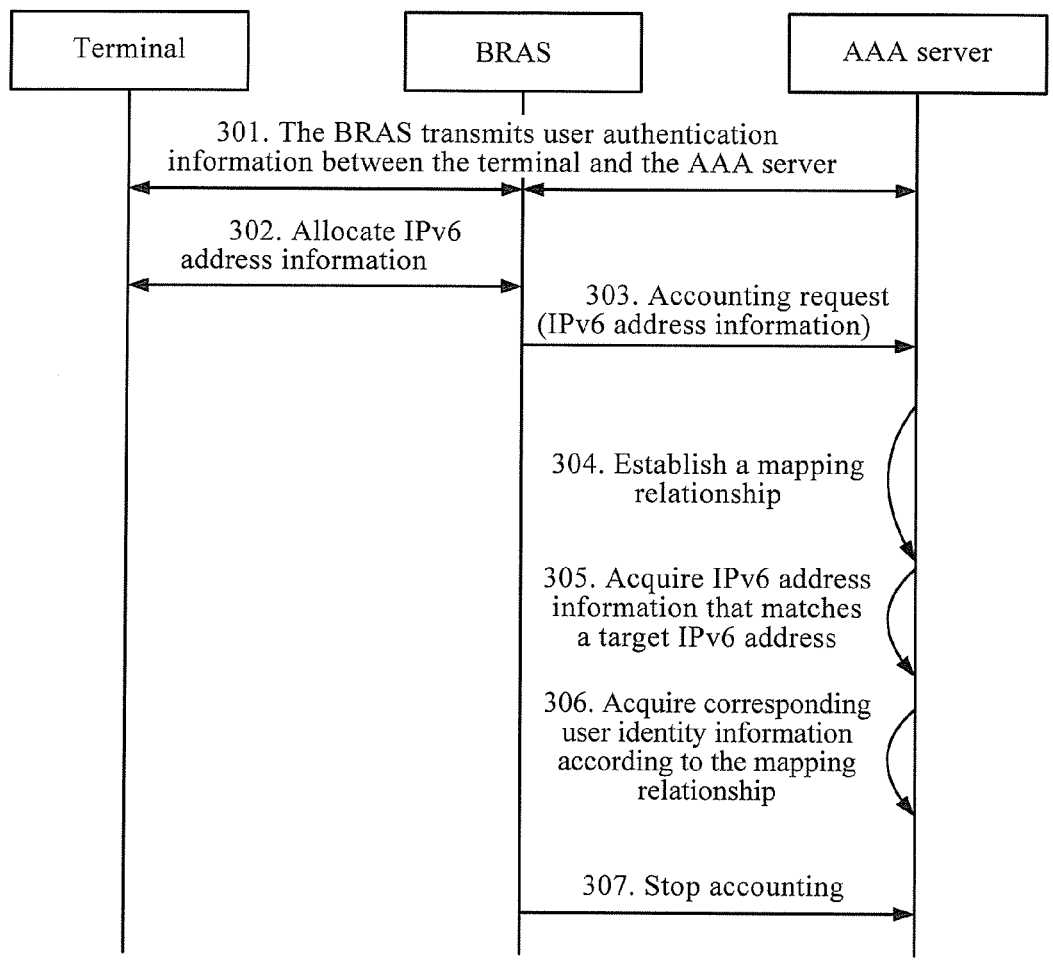
FIG. 3 is a schematic signaling diagram of an IPv6 address tracing method according to still another embodiment of the present application.

FIG. 3 is a schematic signaling diagram of an IPv6 address tracing method according to still another embodiment of the present application. That an access device is a BRAS and an IPv6 address tracing apparatus is an authentication server is used as an example in this embodiment, where the authentication server is, for example, an AAA server; and in this embodiment the AAA server stores user identity information. As shown in FIG. 3, the method includes the following steps:

301. The BRAS transmits user authentication information between a terminal and the AAA server.

By using an example in which a home broadband user accesses the Internet by using the PPPoE, when the user wants to access the Internet to surf the Internet, the user enters the user authentication information by using the terminal and sends the user authentication information to the AAA server, where the user authentication information includes, for example, a user identifier and a password, and the user identifier is, for example, a user account.

In addition, the user authentication information that is entered by the user on the terminal, such as the user identifier, is transparently transmitted to the AAA server by using the BRAS. After authentication of the user authentication information succeeds, the AAA server delivers an authentication result to the BRAS, and the BRAS transmits the authentication result to the terminal to notify the user. The authentication result is, for example, a notification indicating that authentication succeeds.

302. The BRAS allocates IPv6 address information to the terminal when receiving a notification that authentication succeeds that is sent by the AAA server.

After authentication of the user succeeds, the BRAS needs to allocate the IPv6 address information to the terminal used by the user, so that the user uses the IPv6 address information when subsequently accessing the Internet by using the terminal. In addition, the BRAS further specifies some other necessary parameters for the user, such as a domain name server (DNS).

The IPv6 address information described in this embodiment includes an IPv6 address and/or an IPv6 prefix. Specifically, a manner of allocating an IPv6 address is relatively complex, and IPv6 address information allocated in different allocation manners is also different. An IPv6 address of 128 bits (128 bits) may be directly allocated, an IPv6 prefix of 64 bits or another length may be allocated, or the like.

For example, when a home gateway works in a bridge mode, and allocates an address by using the Dynamic Host Configuration Protocol version 6 (DHCPv6), IPv6 address information allocated to the terminal may be an IPv6 address of 128 bits, that is, an IPv6 address allocated in an Identity Association for Non-temporary Address (IA-NA) manner by using the DHCPv6, or may be an allocation manner of a combination of an IPv6 prefix of 64 bits and an interface identifier (Interface ID) of 64 bits.

For another example, when a home gateway works in a bridge mode, and allocates an address by using the Neighbor Discovery Protocol (NDP), IPv6 address information allocated to the terminal may be an IPv6 prefix of 64 bits.

For another example, when a home gateway works in a routing mode, and allocates an address by using the DHCPv6, IPv6 address information allocated to the terminal may include an IPv6-PD prefix with a length less than or equal to 64 bits, that is, an IPv6-PD prefix allocated in an Identity Association for Prefix Delegation (IA-PD) manner by using the DHCPv6. The IPv6 address information may be a combination of an IPv6-PD prefix and an IPv6 address of 128 bits, a combination of an IPv6 prefix of 64 bits and an IPv6-PD prefix, or a manner of a combination of an IPv6-PD prefix, an IPv6 prefix of 64 bits, and an Interface ID of 64 bits.

303. The BRAS sends accounting request information to the AAA server, and send, to the AAA server, the user identifier and the IPv6 address information corresponding to the user identifier.

After allocating the IPv6 address information to the terminal of the user, the BRAS starts to execute an accounting procedure, and enables accounting for surfing the Internet by the user, and notifies the AAA server by using an Accounting request message of the Remote Authentication Dial In User Service (RADIUS) protocol, which is specifically: sending the accounting request message (Start Accounting) to the AAA server. The AAA server returns an accounting response message to the BRAS and starts accounting, and the user can normally access the Internet.

In this embodiment, the accounting request message Start Accounting includes some pieces of attribute information used to carry IP address information. In an existing procedure for reporting an IPv4 address, the Start Accounting includes only two pieces of attribute information, for example, a "User-Name" attribute used to carry user identifier information and a "Framed-IPv4-Address" attribute used to carry an allocated IPv4 address. However, in this embodiment, the attribute information in the Start Accounting is extended, and the following five types of attribute information are designed:

a "User-Name" attribute: used to carry the user identifier;

a "Framed-IPv6-Prefix" attribute (or may be referred to as an IPv6 prefix attribute): used to carry an allocated IPv6 prefix;

a "Framed-Interface-Id" attribute (or may be referred to as an interface identifier attribute): used to carry an allocated interface identifier, that is, an Interface ID;

"a Delegated-IPv6-Prefix" attribute (or may be referred to as an IPv6-PD prefix attribute): used to carry an allocated IPv6-PD prefix; and a "Framed-IPv6-Address" attribute (or may be referred to as an IPv6 address attribute): used to carry an allocated IPv6 address of 128 bits.

With reference to the manner of allocating an IPv6 address described in step 302, the five pieces of attribute information designed in the foregoing can meet a requirement for carrying the IPv6 address information. For example, when an allocated IP address is an IPv6 address of 128 bits, the IPv6 address attribute may be directly used to carry and report the IPv6 address of 128 bits; when an allocated IP address is a combination of an IPv6 prefix of 64 bits and an interface identifier (Interface ID) of 64 bits, both the IPv6 prefix attribute and the interface identifier attribute may be used to report the two pieces of information; when an allocated IP address is an IPv6 prefix of 64 bits, the IPv6 prefix attribute may be used for carrying the IPv6 prefix of 64 bits; when the allocated IPv6 address information includes an IPv6-PD prefix, the IPv6-PD prefix attribute may be used to carry the IPv6-PD prefix.

Optionally, in specific implementation, the Start Accounting may not necessarily include all the attribute information. For example, the BRAS uses only one of the allocation manners to allocate an IPv6 address to the terminal. For example, when only an allocation manner of a combination of an IPv6 prefix of 64 bits and an interface identifier (Interface ID) of 64 bits is used, the attribute information in the Start Accounting may include only the "User-Name" attribute, the "Framed-IPv6-Prefix" attribute, and the "Framed-Interface-ID" attribute. Alternatively, if the BRAS uses only an allocation manner of an IPv6 address of 128 bits, the attribute information in the Start Accounting may include only the "User-Name" attribute and the "Framed-IPv6-Address" attribute.

Therefore, in addition to the "User-Name" attribute, attributes in the Start Accounting that are used to carry the IPv6 address information may include any one of the following: the IPv6 address attribute, the IPv6 prefix attribute, and a combination of the IPv6 prefix attribute and the interface identifier attribute. The IPv6 address information is carried by using any piece of the attribute information. In addition, the IPv6-PD prefix attribute is also optional. When an IPv6-PD prefix needs to be allocated in the manner of allocating an IPv6 address, it is required to set the attribute; when no IPv6-PD prefix is allocated, the attribute may not be set.

304. The AAA server establishes a mapping relationship between the IPv6 address information, the user identifier, and the user identity information.

The AAA server stores the user identity information, where the user identity information includes, for example, a name, an address, an ID card number, and a mobile number of the user, and the AAA server further stores a user identifier, for example, a user account. The foregoing information may be acquired by an operator when the user subscribes in a business office of the operator and stored in the AAA server in a specific manner.

In this embodiment, the AAA server can find, according to the received user identifier, the user identity information corresponding to the user identifier, and because there is a correspondence between the user identifier and the IPv6 address information, the mapping relationship between the IPv6 address information, the user identifier, and the user identity information may be established, that is, the mapping relationship indicates, for a user with a specific user identifier, what user identity information of the user is, and what IPv6 address information allocated to the user when the user surfs the Internet is.

305. When receiving the to-be-traced target IPv6 address, the AAA server acquires, in a longest match manner, the IPv6 address information that matches the target IPv6 address.

The receiving the to-be-traced target IPv6 address may be receiving, by the AAA server, a target IPv6 address entered by an administrator, or may be acquiring the target IPv6 address in another manner. The target IPv6 address refers to a to-be-traced address. For example, when illegal information appears on the Internet, to investigate a suspect who posts the illegal information, a public security department needs to trace an IPv6 address left on the Internet when the suspect surfs the Internet; then, the IPv6 address left by the suspect on the Internet is a to-be-traced target IPv6 address, and the public security department needs to search for user identity information corresponding to the target IPv6 address.

In this embodiment, searching for the IPv6 address information that matches the target IPv6 address is also different from searching for IPv4 address information that matches an IPv4 address. For example, when an existing IPv4 address is traced, because a form of an IPv4 address is simple, that is, an IPv4 address of 32 bits, an exact match manner may be used, and an IPv4 address with identical 32 bits is considered as a matched IPv4 address. However, forms of the IPv6 address in this embodiment are relatively complex, and include multiple forms such as an IPv6 address, and an IPv6 prefix with a variable length. When address matching is performed, some bits of multiple pieces of IPv6 address information may be the same as those of the target IPv6 address. In this case, a traditional exact match solution cannot be used, the target IPv6 address may be compared, for example, in a longest match manner, with each piece of IPv6 address information that is stored, and IPv6 address information that has the most information matching the target IPv6 address may be selected as the IPv6 address information that matches the target IPv6 address. The IPv6 prefix information includes one of the following: an IPv6 prefix, an IPv6-PD prefix, and an interface identifier.

For example, referring to the following Table 1, Table 1 is an optional manner of recording IPv6 address information, which is stored in the AAA server. It should be noted that Table 1 is mainly used to illustrate how the longest match manner in this embodiment is performed and is not intended to limit another manner in which the AAA server records related information, and Table 1 merely shows a part of but not all of key information related to descriptions of the longest match manner.

TABLE 1

| Record Identifier | User Identifier(A) | User Identity Information(B) | IPv6 Address Information |
|---|---|---|---|
| 1 | A1 | B1 | IPv6 address (128 bits) |
| 2 | A1 | B1 | IPv6-PD prefix (40 bits) |

TABLE 1-continued

| Record Identifier | User Identifier(A) | User Identity Information(B) | IPv6 Address Information |
|---|---|---|---|
| 3 | A2 | B2 | IPv6 prefix (64 bits) |
| 4 | A2 | B2 | IPv6-PD prefix (40 bits) |
| 5 | A3 | B3 | IPv6 address (128 bits) |
| 6 | A4 | B4 | IPv6 address (128 bits) −1 |
| 7 | A4 | B4 | IPv6 address (128 bits) −2 |

Referring to Table 1, it is assumed that there are the following allocation manners: IPv6 address information is allocated by the BRAS to a user with the user identifier A1 in a combination of "an IPv6 address of 128 bits+an IPv6-PD prefix of 40 bits"; when the AAA server side records a mapping relationship, actually, the "IPv6 address of 128 bits" and the "IPv6-PD prefix of 40 bits" in the combination, as two pieces of IPv6 address information, need to be placed in two records (each record is equivalent to a mapping relationship), and are respectively used to establish a mapping relationship with a user identifier and user identity information, that is, the foregoing two pieces of IPv6 address information are actually mapped to a same user. IPv6 address information allocated by the BRAS to a user with the user identifier A2 is a combination of "an IPv6 prefix of 64 bits+an IPv6-PD prefix of 40 bits", and similarly two mapping relationships are recorded. IPv6 address information allocated by the BRAS to a user with the user identifier A3 is an IPv6 address of 128 bits.

It is assumed that the AAA server receives the to-be-traced target IPv6 address, that is, the IPv6 address left by the suspect on the Internet, and the target IPv6 address is an IPv6 address of 128 bits. The AAA server performs tracing in the following manner: The IPv6 address of 128 bits is compared with each piece of IPv6 address information in the foregoing Table 1, that is, compared with each piece of IPv6 address information in records with record identifiers 1 to 5, to find how much information is the same. For example, it is assumed that a result of the comparing is: the IPv6 address in the record 1 is the same as the first 50 bits of information of the target IPv6 address, the IPv6-PD prefix in the record 2 is the same as the first 40 bits of information of the target IPv6 address, the IPv6 prefix in the record 3 is the same as the first 64 bits of information of the target IPv6 address, the IPv6-PD prefix in the record 4 is the same as the first 40 bits of information of the target IPv6 address, and the IPv6 address in the record 5 is the same as the first 20 bits of information of the target IPv6 address. It may be determined that the IPv6 prefix in the record 3 has the most information matching the target IPv6 address, and the IPv6 prefix is the IPv6 address information that matches the target IPv6 address.

In specific implementation, there is another case in which the BRAS may allocate IPv6 addresses or prefixes to a same user. For example, referring to the record 6 and record 7 in Table 1, the two records correspond to a same user A4, and the BRAS allocates two different IPv6 addresses of 128 bits to the user, that is, an IPv6 address-1 and an IPv6 address-2. A manner of searching IPv6 address information that matches the target IPv6 address in this scenario is actually the same as the foregoing matching manner. Similarly, it is required to compare the target IPv6 address with each piece of IPv6 address information, and select IPv6 address information that has the most information matching the target IPv6 address as the IPv6 address information that matches the target IPv6 address. Because the methods are the same, details are not described again.

In addition, in specific implementation, the BRAS needs to re-allocate an IPv6 address to a user each time the user surfs the Internet, the IPv6 address may be a new address, and a same IPv6 address may be allocated to different users at different periods of time. Therefore, when acquiring the to-be-traced target IPv6 address, the AAA server actually further needs to acquire a period of time during which the target IPv6 address is used. In addition, when storing the mapping relationship, the AAA server side also needs to record time of the IPv6 address information, where the time is, for example, time at which the AAA server receives the IPv6 address information, or time at which the IPv6 address information reported by the BRAS to the AAA server is allocated. In this way, the IPv6 address information that matches the target IPv6 address may be accurately found according to the period of time during which the received target IPv6 address is used. For example, if a time factor is not considered, two pieces of same IPv6 address information that match the target IPv6 address may be found, and are corresponding to different users. Further, by considering the time factor, it can be obtained that IPv6 address information that matches the period of time during which the target IPv6 address is used is the IPv6 address information to be searched for.

306. The AAA server acquires, according to the mapping relationship between the IPv6 address information, the user identifier, and the user identity information, user identity information corresponding to the target IPv6 address.

Reference may be made to Table 1. It is assumed that, in step 305, it has been determined that the IPv6 prefix in the record 3 has the most information matching the target IPv6 address, and the IPv6 prefix is the IPv6 address information that matches the target IPv6 address. Then, according to a mapping relationship shown in the record 3, the user identity information B2 corresponding to the IPv6 prefix is the user identity information corresponding to the target IPv6 address, so that tracing of the target IPv6 address is implemented.

307. The BRAS instructs the AAA server to stop accounting.

When the user goes offline, the BRAS instructs, by using the Accounting request message (that is, a stop accounting request) of the RADIUS protocol, the AAA server to stop accounting.

In addition, procedures for access and tracing by an IPv6 PPPoE user are used as examples in this embodiment, and another scenario, for example, the IP over Ethernet (IPoE) protocol, is similar, and is not described herein again.

Embodiment 4

Figure 4:
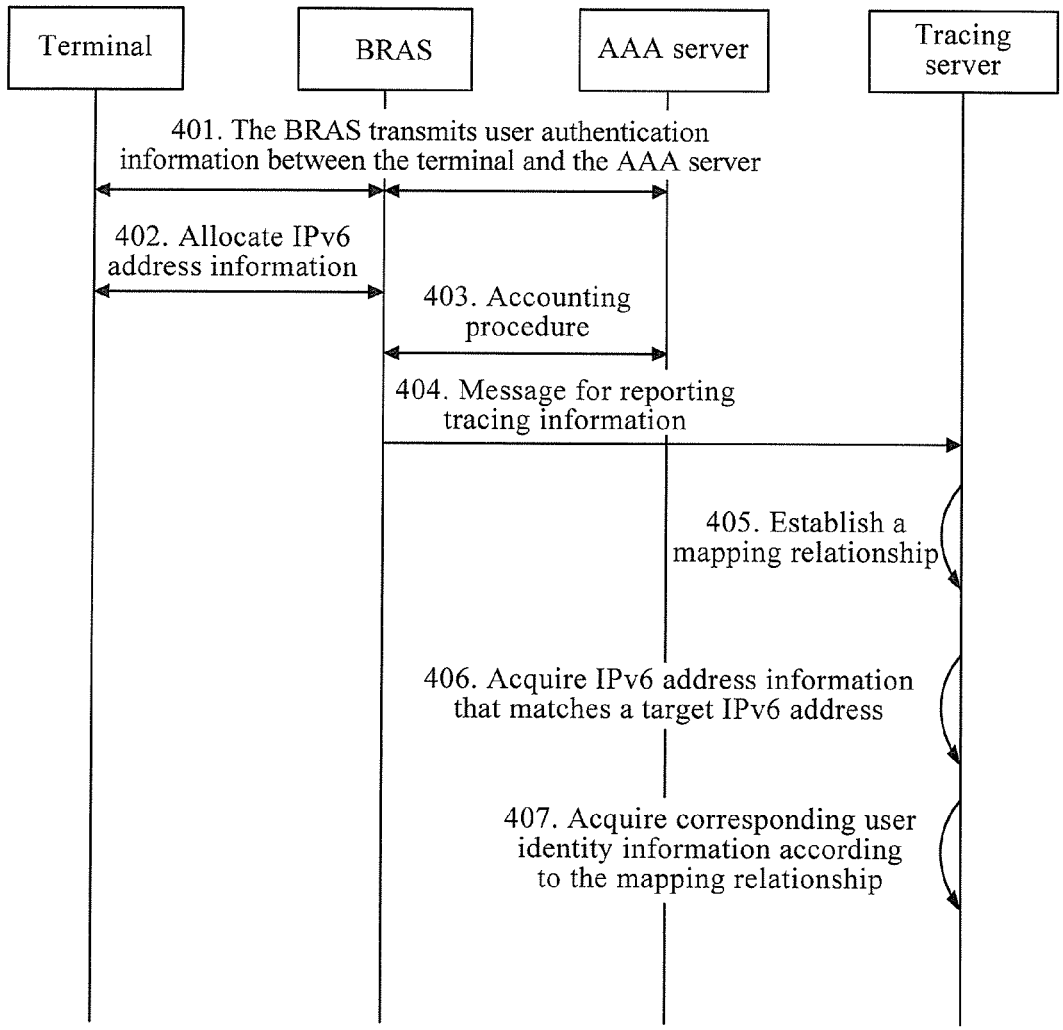
FIG. 4 is a schematic signaling diagram of an IPv6 address tracing method according to yet another embodiment of the present application.

FIG. 4 is a schematic signaling diagram of an IPv6 address tracing method according to yet another embodiment of the present application. That an access device is a BRAS and an IPv6 address tracing apparatus is a tracing server is used as an example in this embodiment, where the tracing server is an independent device used for tracing, and in this embodiment the tracing server stores user identity information. Therefore, a procedure in this embodiment is basically consistent with that in FIG. 3 except that IPv6 address information needs to be reported to the tracing server, and processing of tracing is performed by the tracing server. Details are not described again.

As shown in FIG. 4, the method includes the following steps:

401. The BRAS transmits user authentication information between a terminal and an AAA server.

402. When receiving a notification that authentication succeeds that is sent by the AAA server, the BRAS allocates IPv6 address information to the terminal.

403. The BRAS performs an accounting procedure between the BRAS and the AAA server.

The accounting procedure is, for example, that the BRAS sends an accounting request message (Start Accounting) to the AAA server, the AAA server returns an accounting response message (Accounting-Ack) to the BRAS, the BRAS sends a stop accounting request (Stop Accounting) to the AAA server, or the like.

It should be noted that a flowchart in this embodiment merely shows related steps but is not intended to limit an execution order of the steps, for example, in FIG. 4, 403 is executed before 404, and in specific implementation, 403 may also be executed after 404, or a part of the step in 403, for example, that the BRAS sends stop accounting request to the AAA server, may be executed after 404, or the like.

404. The BRAS sends, to the tracing server, a message for reporting tracing information, and sends a user identifier and the IPv6 address information to the tracing server.

The tracing information in this step, that is, the user identifier and the IPv6 address information, is not carried in the Start Accounting sent by the BRAS to the AAA server, but in the message of reporting tracing information. A reporting manner of the message is similar to that of the Start Accounting, where several pieces of attribute information used to carry the IPV 6 address information, for example, an IPv6 address attribute and an IPv6 prefix attribute, are designed in the message, and details are not described again.

405. The tracing server establishes a mapping relationship between the IPv6 address information, the user identifier, and the user identity information.

406. When receiving a to-be-traced target IPv6 address, the tracing server acquires the IPv6 address information that matches the target IPv6 address.

407. The tracing server acquires, according to the mapping relationship between the IPv6 address information, the user identifier, and the user identity information, user identity information corresponding to the target IPv6 address.

Embodiment 5

Figure 5:
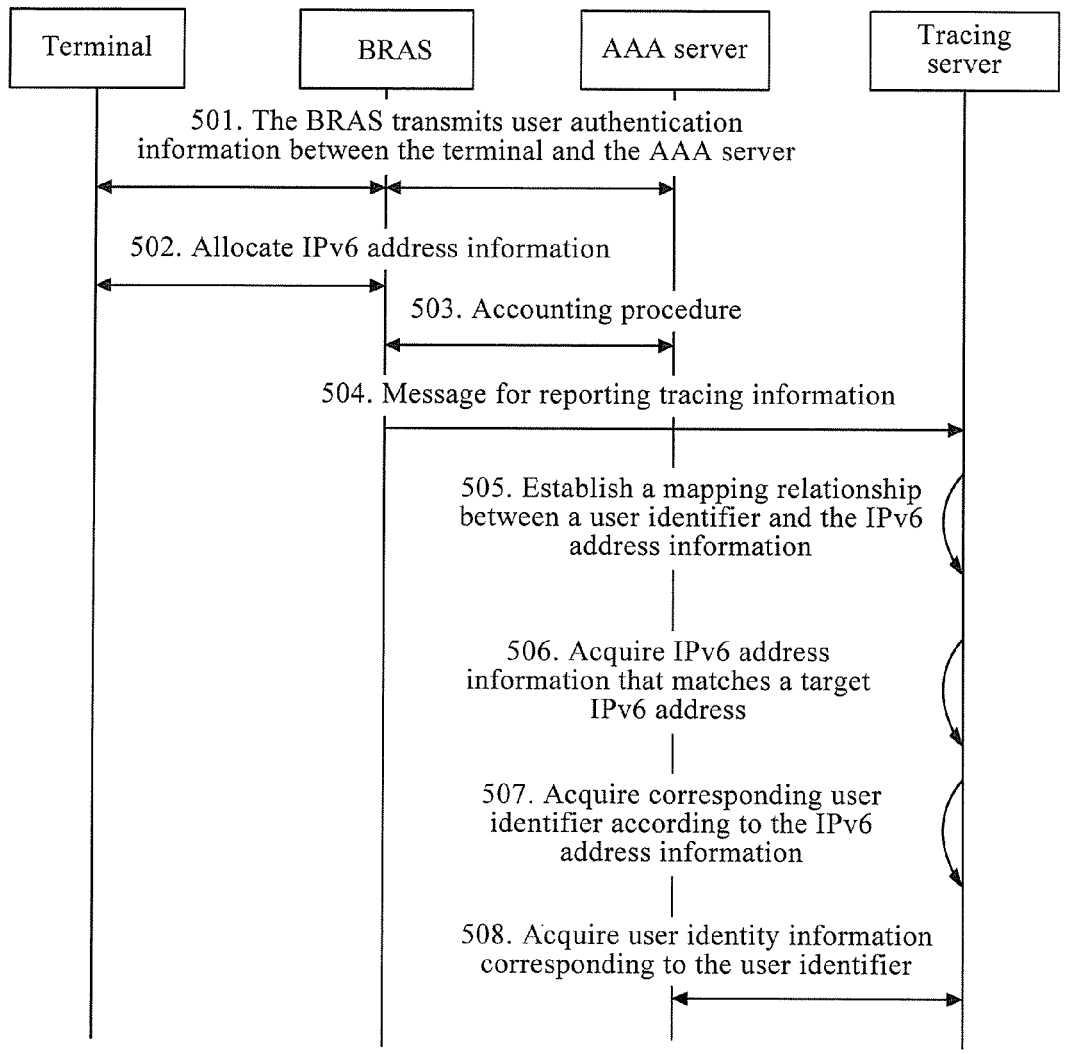
FIG. 5 is a schematic signaling diagram of an IPv6 address tracing method according to still yet another embodiment of the present application.

FIG. 5 is a schematic signaling diagram of an IPv6 address tracing method according to still yet another embodiment of the present application. That an access device is a BRAS and an IPv6 address tracing apparatus is a tracing server is used as an example in this embodiment, where the tracing server is an independent device configured for tracing, and in this embodiment the tracing server does not store user identity information and needs to acquire the user identity information from an AAA server. As shown in FIG. 5, the method includes the following steps:

501. The BRAS transmits user authentication information between a terminal and the AAA server.

502. When receiving a notification that authentication succeeds that is sent by the AAA server, the BRAS allocates IPv6 address information to the terminal.

503. The BRAS performs an accounting procedure between the BRAS and the AAA server.

504. The BRAS sends, to the tracing server, a message for reporting tracing information, and sends a user identifier and the IPv6 address information to the tracing server.

505. The tracing server establishes a mapping relationship between the IPv6 address information and the user identifier.

Because in this embodiment the tracing server does not store the user identity information, after receiving the IPv6 address information and the user identifier in step 504, the tracing server establishes only the mapping relationship between the IPv6 address information and the user identifier.

506. When receiving a to-be-traced target IPv6 address, the tracing server acquires the IPv6 address information that matches the target IPv6 address.

507. The tracing server obtains, according to the IPv6 address information, a user identifier that is stored by the tracing server and corresponding to the IPv6 address information.

In this step, the tracing server obtains a corresponding user identifier according to the IPv6 address information that is obtained in step 506 and matches the target IPv6 address, and the mapping relationship that is established in the step 505 and is between the IPv6 address information and the user identifier.

508. The tracing server acquires, from the AAA server according to the user identifier, user identity information corresponding to the user identifier, where the user identity information is user identity information corresponding to the target IPv6 address.

The AAA server side not only stores the user identifier, but also stores the corresponding user identity information. The tracing server may send, to the AAA server, a request for acquiring the user identity information, where the request carries the user identifier determined in step 507. The AAA server searches, according to the user identifier, for the user identity information that is stored on the AAA server side and corresponding to the user identifier, and returns the user identity information to the tracing server.

For the foregoing two steps 507 and 508, actually, a search for mapping between the IPv6 address information and the user identifier is performed by the tracing server, and a search for mapping between the user identifier and the user identity information is performed by the AAA server. However, the two searches, when combined together, are also equivalent to acquiring the user identity information corresponding to the target IPv6 address according to the mapping relationship between the IPv6 address information, the user identifier, and the user identity information, which is performed, however, by different devices.

Embodiment 6

The solutions in the embodiments of the present application are also applicable to a mobile network. In the mobile network, roles of a gateway GPRS support node (GGSN) (2G/3G) and a PDN gateway (PGW) (LTE) are similar to a BRAS, and are responsible for performing authentication and address allocation for a mobile user.

Figure 6:
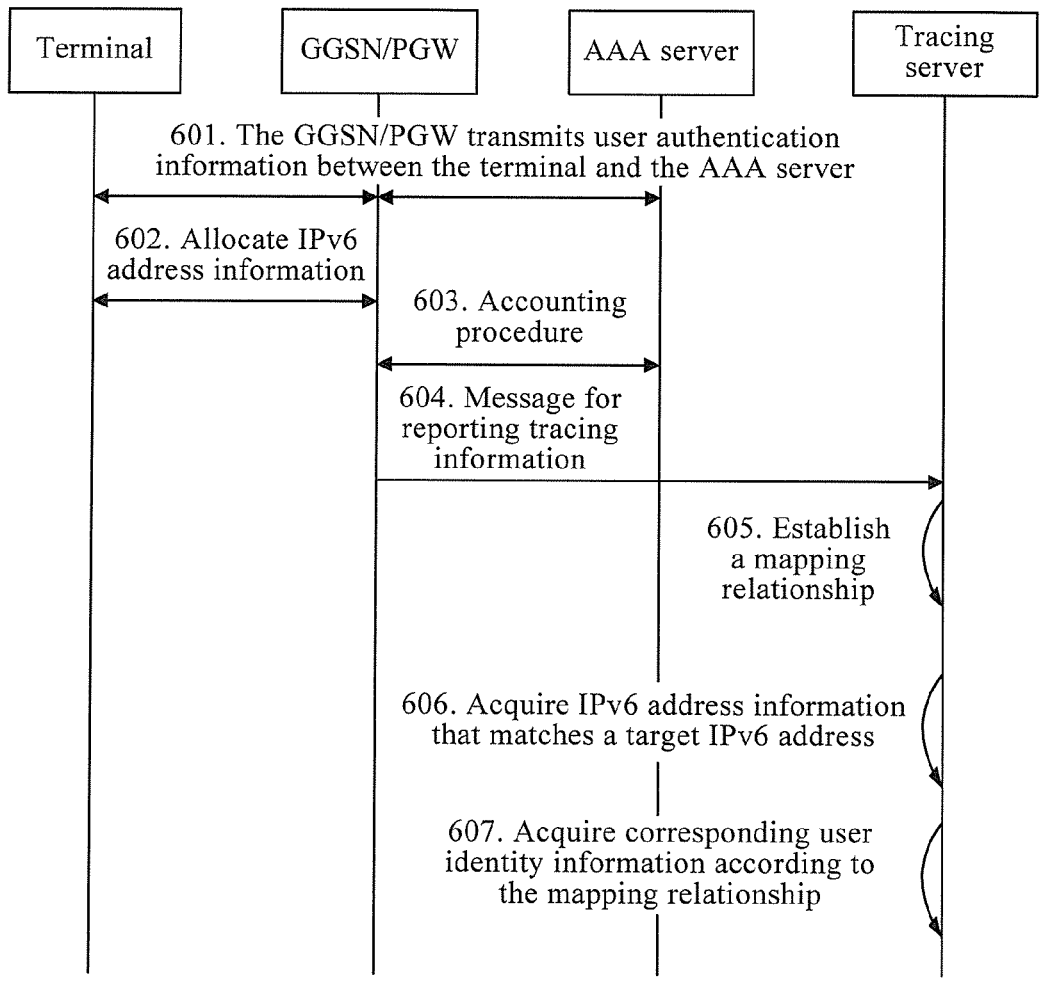
FIG. 6 is a schematic signaling diagram of an IPv6 address tracing method according to a further embodiment of the present application.

FIG. 6 is a schematic signaling diagram of an IPv6 address tracing method according to a further embodiment of the present application. That an access device is a GGSN or a PGW, and an IPv6 address tracing apparatus is a tracing server is used as an example in this embodiment, where the tracing server is an independent device, and in this embodiment the tracing server stores user identity information. Therefore, a procedure in this embodiment is basically consistent with that in FIG. 4 except that the GGSN or the PGW instead of a BRAS reports tracing information. For detailed steps, refer to FIG. 4, and details are not described again.

As shown in FIG. 6, the method includes the following steps:

601. The GGSN or the PGW transmits user authentication information between a terminal and an AAA server.

602. When receiving a notification that authentication succeeds that is sent by the AAA server, the GGSN or the PGW allocates IPv6 address information to the terminal.

603. The GGSN or the PGW performs an accounting procedure between the GGSN or the PGW and the AAA server.

604. The GGSN or the PGW sends, to the tracing server, a message for reporting tracing information, and sends a user identifier and the IPv6 address information to the tracing server.

605. The tracing server establishes a mapping relationship between the IPv6 address information, the user identifier, and the user identity information.

606. When receiving a to-be-traced target IPv6 address, the tracing server acquires the IPv6 address information that matches the target IPv6 address.

607. The tracing server acquires, according to the mapping relationship between the IPv6 address information, the user identifier, and the user identity information, user identity information corresponding to the target IPv6 address.

In addition, that the IPv6 address tracing apparatus is the tracing server, and the tracing server stores the user identity information is used as an example in this embodiment. In specific implementation of the mobile network, there may also be another scenario in which, for example, the IPv6 address tracing apparatus is the AAA server, the GGSN or the PGW sends the user identifier and the IPv6 address information to the AAA server, and the AAA server establishes a related mapping relationship and performs tracing. In this case, the procedure is similar to that shown in FIG. 3. Alternatively, it may also be that the IPv6 address tracing apparatus is still the tracing server, but the tracing server does not maintain the user identity information, and needs to acquire, from the AAA server, the user identity information corresponding to the user identifier. In this case, the procedure is similar to that shown in FIG. 5.

Embodiment 7

Figure 7:
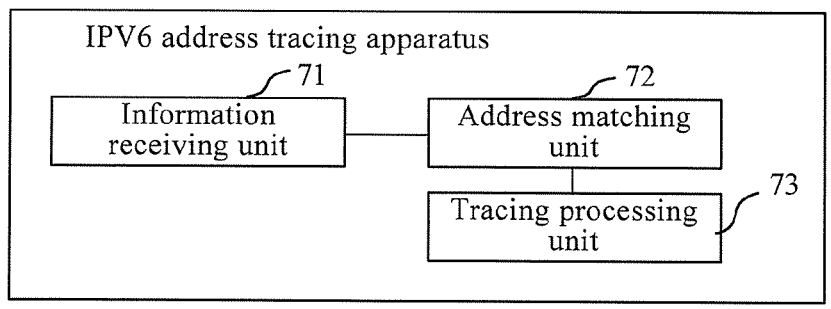
FIG. 7 is a schematic structural diagram of an IPv6 address tracing apparatus according to an embodiment of the present application.

FIG. 7 is a schematic structural diagram of an IPv6 address tracing apparatus according to an embodiment of the present application, where the IPv6 address tracing apparatus may execute the method in any embodiment of the present application. The IPv6 address tracing apparatus may be, for example, an authentication server or an independent tracing server. As shown in FIG. 7, the IPv6 address tracing apparatus may include an information receiving unit 71, an address matching unit 72, and a tracing processing unit 73.

The information receiving unit 71 is configured to receive a to-be-traced target IPv6 address.

The address matching unit 72 is configured to select, in a longest match manner, IPv6 address information that matches the target IPv6 address, where the IPv6 address information includes an IPv6 address or IPv6 prefix information.

For example, the IPv6 prefix information includes one of the following: an IPv6 prefix, an IPv6-PD prefix, and an interface identifier.

The tracing processing unit 73 is configured to acquire a user identifier corresponding to the IPv6 address information.

Figure 8:
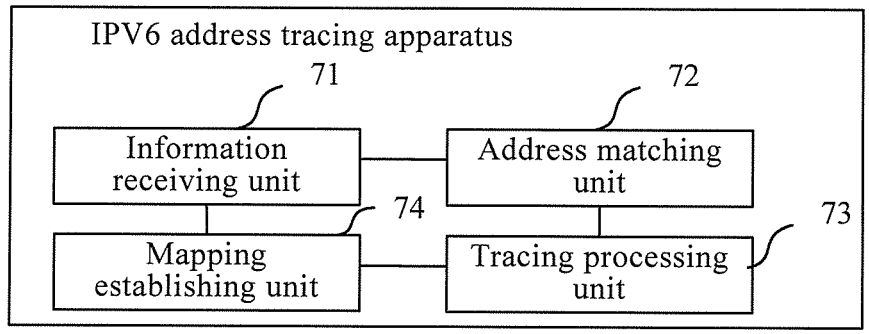
FIG. 8 is a schematic structural diagram of an IPv6 address tracing apparatus according to another embodiment of the present application.

FIG. 8 is a schematic structural diagram of an IPv6 address tracing apparatus according to another embodiment of the present application. As shown in FIG. 8, the apparatus further includes a mapping establishing unit 74.

The information receiving unit 71 is further configured to: before receiving the to-be-traced target IPv6 address, receive the user identifier and the IPv6 address information corresponding to the user identifier that are sent by an access device.

The mapping establishing unit 74 is configured to store a correspondence between the user identifier and the IPv6 address information.

Further, the mapping establishing unit 74 is further configured to acquire, according to the user identifier, user identity information that is stored in the mapping establishing unit 74 and corresponding to the user identifier, and store a mapping relationship between the IPv6 address information, the user identifier, and the user identity information.

The tracing processing unit 73 is further configured to: after acquiring the user identifier corresponding to the IPv6 address information, obtain, according to the mapping relationship, user identity information corresponding to the user identifier.

Further, the tracing processing unit 73 is further configured to: after acquiring the user identifier corresponding to the IPv6 address information, acquire, from the authentication server according to the user identifier, user identity information corresponding to the user identifier.

Embodiment 8

This embodiment provides an IPv6 address tracing system, where the IPv6 address tracing system may execute the method in any embodiment of the present application. The IPv6 address tracing system may include the IPv6 address tracing apparatus described in any embodiment of the present application. For a structure of the IPv6 address tracing apparatus, refer to the foregoing embodiments, and details are not described again.

Figure 9:
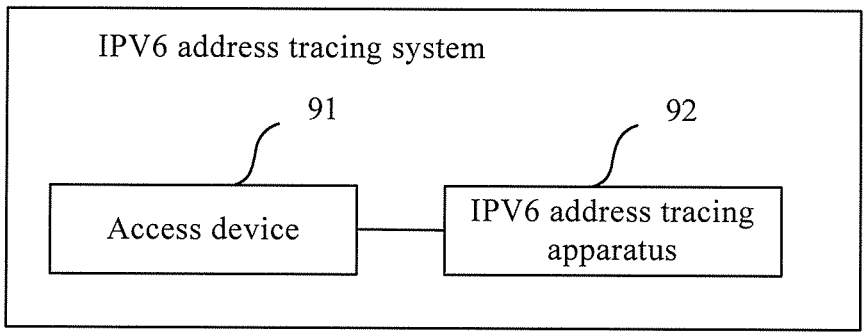
FIG. 9 is a schematic structural diagram of an IPv6 address tracing system according to an embodiment of the present application.

FIG. 9 is a schematic structural diagram of an IPv6 address tracing system according to an embodiment of the present application. Optionally, the system may include an access device 91 and an IPv6 address tracing apparatus 92.

The access device 91 is configured to: before the IPv6 address tracing apparatus 92 receives a to-be-traced target IPv6 address, send a user identifier and IPv6 address information corresponding to the user identifier to the IPv6 address tracing apparatus 92.

The IPv6 address tracing apparatus 92 is further configured to store a correspondence between the user identifier and the IPv6 address information.

For example, the IPv6 address tracing apparatus 92 in this embodiment may be an AAA server.

Further, the IPv6 address tracing apparatus 92 is further configured to acquire, according to the user identifier, user identity information that is stored in the IPv6 address tracing apparatus 92 and corresponding to the user identifier, and store a mapping relationship between the IPv6 address information, the user identifier, and the user identity information; and after acquiring the user identifier corresponding to the IPv6 address information, obtain, according to the mapping relationship, the user identity information corresponding to the user identifier.

Figure 10:
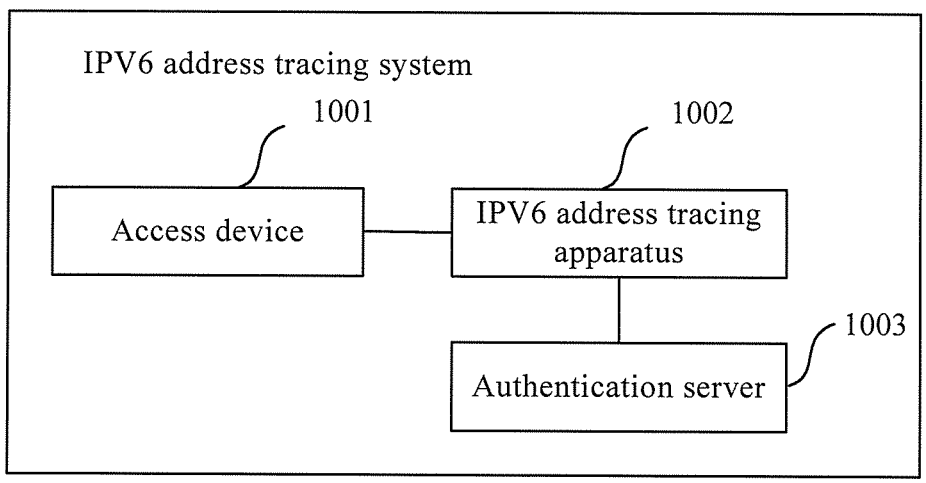
FIG. 10 is a schematic structural diagram of an IPv6 address tracing system according to another embodiment of the present application.

FIG. 10 is a schematic structural diagram of an IPv6 address tracing system according to another embodiment of the present application. Optionally, the system may include an access device 1001, an IPv6 address tracing apparatus 1002, and an authentication server 1003, where the IPv6 address tracing apparatus 1002 is configured to acquire, after acquiring a user identifier corresponding to IPv6 address information, acquire, from the authentication server 1003 according to the user identifier, user identity information corresponding to the user identifier.

For example, the IPv6 address tracing apparatus 92 in this embodiment may be an independent tracing server.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc.

Finally, it should be noted that the foregoing embodiments are merely intended for describing the technical solutions of the present application, but not for limiting the present application. Although the present application is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present application.

What is claimed is:

1. An IPv6 address tracing method, comprising:
   receiving, by an IPv6 address tracing apparatus, a user identifier and an IPv6 address information corresponding to the user identifier from an access device;
   saving, by the IPv6 address tracing apparatus, a correspondence between the user identifier and the IPv6 address information;
   receiving, by the IPv6 address tracing apparatus, a to-be-traced target IPv6 address;
   selecting, by the IPv6 address tracing apparatus, in a longest match manner, the IPv6 address information that matches the target IPv6 address, wherein the IPv6 address information comprises an IPv6 address or IPv6 prefix information, and wherein the IPv6 prefix information comprises an interface identifier;
   acquiring, by the IPv6 address tracing apparatus, the user identifier corresponding to the IPv6 address information according to the correspondence between the user identifier and the IPv6 address information;
   acquiring, by the IPv6 address tracing apparatus, according to the user identifier, user identity information that is stored in the IPv6 address tracing apparatus and corresponding to the user identifier, and saving a mapping relationship between the IPv6 address information, the user identifier, and the user identity information; and
   after acquiring, by the IPv6 address tracing apparatus, the user identifier corresponding to the IPv6 address information, the method further comprises:
      acquiring, by the IPv6 address tracing apparatus, according to the mapping relationship, the user identity information corresponding to the user identifier.

2. An IPv6 address tracing apparatus, wherein the IPv6 address tracing apparatus comprises:
   a processor; and
   a non-transitory memory coupled to the processor, the memory comprising instructions that, when executed by the processor, cause the apparatus to:
      receive a user identifier and an IPv6 address information corresponding to the user identifier from an access device;
      store a correspondence between the user identifier and the IPv6 address information;
      receive a to-be-traced target IPv6 address;
      select, in a longest match manner, the IPv6 address information that matches the target IPv6 address, wherein the IPv6 address information comprises an IPv6 address or IPv6 prefix information;
      acquire the user identifier corresponding to the IPv6 address information according to the correspondence between the user identifier and the IPv6 address information, and wherein the IPv6 prefix information comprises an interface identifier;
      acquire, according to the user identifier, user identity information that is stored in the memory and corresponding to the user identifier, and store a mapping relationship between the IPv6 address information, the user identifier, and the user identity information; and
      after acquiring the user identifier corresponding to the IPv6 address information, obtain, according to the mapping relationship, the user identity information corresponding to the user identifier.

3. An IPv6 address tracing system, comprising:
   an IPv6 address tracing apparatus and an access device;
   wherein:
   the access device comprises:
      a first processor; and
      a first memory coupled to the first processor, the first memory comprising first instructions that, when executed by the first processor, cause the access device to send, to the IPv6 address tracing apparatus, a user identifier and an IPv6 address information corresponding to the user identifier; and
   the IPv6 address tracing apparatus comprises:
      a second processor; and
      a second memory coupled to the second processor, the second memory comprising second instructions that, when executed by the second processor, cause the IPv6 tracing apparatus to:
         store a correspondence between the user identifier and the IPv6 address information;
         receive a to-be-traced target IPv6 address;
         select, in a longest match manner, the IPv6 address information that matches the target IPv6 address, wherein the IPv6 address information comprises an IPv6 address or IPv6 prefix information, and wherein the IPv6 prefix information comprises an interface identifier;
         acquire the user identifier corresponding to the IPv6 address information according to the correspondence between the user identifier and the IPv6 address information;
         acquire, according to the user identifier, user identity information that is stored in the IPv6 address tracing apparatus and corresponding to the user identifier;
         store a mapping relationship between the IPv6 address information, the user identifier, and the user identity information; and
         after acquiring the user identifier corresponding to the IPv6 address information, obtain, according to the mapping relationship, the user identity information corresponding to the user identifier.

* * * * *